(12) United States Patent
Nozaki (10) Patent No.: US 8,611,717 B2
(45) Date of Patent: Dec. 17, 2013

(54) IMAGE DATA MANAGEMENT DEVICE (75) Inventor: Hirotake Nozaki, Port Washington, NY (US)

(73) Assignee: Nikon Corporation, Tokyo (JP)

(*) Notice: Subject to any disclaimer, the term of this patent is extended or adjusted under 35 U.S.C. 154(b) by 1746 days.

(21) Appl. No.: 11/663,212

(22) PCT Filed: Sep. 15, 2005

(86) PCT No.: PCT/JP2005/017026
§ 371 (c)(1),
(2), (4) Date: Apr. 26, 2007

(87) PCT Pub. No.: WO2006/033274
PCT Pub. Date: Mar. 30, 2006

(65) Prior Publication Data
US 2007/0294300 A1 Dec. 20, 2007

(30) Foreign Application Priority Data
Sep. 22, 2004 (JP) .................. 2004-276065

(51) Int. Cl.
*H04N 5/77* (2006.01)
(52) U.S. Cl.
USPC ........... 386/224; 386/223; 386/230; 386/279; 386/294; 386/289; 386/290; 386/286
(58) Field of Classification Search
USPC ......... 386/224, 223, 230, 279, 294, 289, 290, 386/286
See application file for complete search history.

(56) References Cited

U.S. PATENT DOCUMENTS

| 5,214,622 | A | * | 5/1993 | Nemoto et al. ................. 368/10 |
| 5,719,987 | A | | 2/1998 | Kawamura et al. |
| 5,777,845 | A | | 7/1998 | Krum et al. |
| 6,816,620 | B2 | * | 11/2004 | Enomoto et al. ............. 382/254 |
| 7,020,380 | B1 | * | 3/2006 | Igarashi ........................ 386/234 |
| 7,714,906 | B2 | * | 5/2010 | Shiimori ................... 348/231.2 |
| 7,843,577 | B2 | * | 11/2010 | Yokokawa ..................... 358/1.1 |
| 7,993,200 | B2 | * | 8/2011 | Suzuki et al. .................. 463/34 |
| 8,032,012 | B2 | * | 10/2011 | Yahata et al. ................. 386/330 |

(Continued)

FOREIGN PATENT DOCUMENTS

| EP | 1 030 518 A2 | 8/2000 |
| JP | A 5-91455 | 4/1993 |

(Continued)

OTHER PUBLICATIONS

Supplementary European Search Report issued in European Patent Application No. 05783263.6 dated Dec. 2, 2010.

(Continued)

*Primary Examiner* — Helen Shibru
(74) *Attorney, Agent, or Firm* — Oliff & Berridge, PLC (57) ABSTRACT

An image data management device has a data reading unit and a control section. The data reading unit includes a plurality of recording medium insert sections. To the recording medium insert section, a recording medium having recorded photographic image data is connected detachably and data can be read from and written to the recording medium. The control section acquires imaging date/time information included in each photographic image data, classifies the groups of photographic image data recorded in each recording medium of the data reading unit according to the imaging date/time, and moves the photographic image data among the recording media based on the result of classification.

14 Claims, 8 Drawing Sheets

(56) References Cited

U.S. PATENT DOCUMENTS

| | | | |
|---|---|---|---|
| 2002/0036699 A1 | 3/2002 | Nicklos et al. | |
| 2002/0051629 A1 | 5/2002 | Endo | |
| 2003/0031457 A1 | 2/2003 | Miomo et al. | |
| 2003/0151767 A1 | 8/2003 | Habuta et al. | |
| 2003/0184650 A1 | 10/2003 | Brown et al. | |
| 2004/0022522 A1 | 2/2004 | Terada | |
| 2004/0066537 A1 | 4/2004 | Youden | |
| 2004/0105656 A1* | 6/2004 | Shimada et al. | 386/46 |
| 2004/0177218 A1 | 9/2004 | Meehan et al. | |
| 2004/0212735 A1* | 10/2004 | Kitamura | 348/553 |
| 2005/0024513 A1* | 2/2005 | Hayashi et al. | 348/333.01 |

FOREIGN PATENT DOCUMENTS

| | | |
|---|---|---|
| JP | A 2001-333352 | 11/2001 |
| JP | A 2002-132776 | 5/2002 |
| JP | A 2002-262241 | 9/2002 |
| JP | A-2003-101739 | 4/2003 |
| JP | A 2003-196668 | 7/2003 |
| JP | A 2003-259279 | 9/2003 |
| JP | A 2003-346089 | 12/2003 |
| JP | A-2004-64396 | 2/2004 |
| JP | A 2004-133520 | 4/2004 |
| JP | A 2004-221974 | 8/2004 |
| WO | WO 2004/027617 A1 | 4/2004 |

OTHER PUBLICATIONS

Japanese Office Action issued by Japanese Patent Office in Japanese Patent Application 2004-276065 on Mar. 23, 2010 (with English translation).

Dec. 6, 2011 Office Action issued in European Patent Application No. 05 783 263.6.

* cited by examiner

| IMAGE NO. | CARD SLOT NO. | FILE NAME | FOLDER NAME | IMAGING DATE/TIME | DATA AMOUNT |
|---|---|---|---|---|---|
| 1 | 2 | DSCN0001.JPG | ¥DCIM¥100NIKON | 2003/12/05 14:05 | ●●KB |
| 2 | 2 | DSCN0002.JPG | ¥DCIM¥100NIKON | 2003/12/05 16:30 | ○○KB |
| 3 | 3 | DSCN0532.JPG | ¥DCIM¥101NIKON | 2003/12/06 19:25 | ●●KB |
| 4 | 2 | DSCN0003.JPG | ¥DCIM¥100NIKON | 2003/12/07 21:46 | ○○KB |

IMAGE DATA MANAGEMENT DEVICE

CROSS-REFERENCE TO RELATED APPLICATION

This application is a U.S. National Stage application claiming the benefit of prior filed International Application Number PCT/JP2005/017026, filed Sep. 15, 2005, in which the International Application claims a priority date of Sep. 22, 2004 based on prior filed Japanese Application No. 2004-276065, the entire contents of which are incorporated herein by reference.

TECHNICAL FIELD

The present invention relates to an image data management device that edits photographic image data recorded between two or more card-type recording media.

BACKGROUND ART

In recent years, an electronic camera is rapidly spreading, which records photographic image data of an object image photographed by an image pickup device in a card-type recording medium, such as a semiconductor memory. It is common for a user of an electronic camera to transfer photographic image data to a personal computer etc. for management/maintenance thereof, however, in recent years, the number of users who make use of the card-type recording medium as a final storage medium is also increasing. Also, an image reproducing device is publicly known, which reads and reproduces to display photographic image data from a card-type recording medium for a user etc. who manages photographic image data in the card-type recording medium, as described above (refer to Patent Document 1 and Patent Document 2).

However, even with the image reproduction device in the above-mentioned Patent Document 1 and Patent Document 2, if the number of card-type recording media a user has increases, edition and management of photographic image data will become very complicated. For example, when a user carries two or more cameras at the same time, or two or more card-type recording media are used alternately, there will exist various imaging dates/times mixedly in the two or more card-type recording media, and often, edition and management of photographic image data becomes difficult. In addition, if the card-type recording medium is used as a final storage medium, often, a vacant capacity is left unused in each card-type recording medium and therefore, in the actual case, the memory of a card-type recording medium is not used effectively.

Further, in recent years, a DPOF (Digital Print Order Format) system has been proposed and put to practical use. In this system, photographic image data that a user desires to print out is specified in advance by a digital camera etc. and its card-type recording medium is inserted into a dedicated printer to automatically print out specified still images. With a conventional card viewer, however, although a printing can be specified with the DPOF, when the photographic image data to be specified for printing exists over two or more card-type recording media, a DPOF file is created for each card-type recording medium. Because of this, conventionally, it is necessary to bring all of the card-type recording media specified for printing with the DPOF to a shop or to specify printing after editing the photographic image data to be specified for printing into one card-type recording medium, resulting in complicated processing.

Patent Document 1: Japanese Unexamined Patent Application Publication No. 2002-132776
Patent Document 2: Japanese Unexamined Patent Application Publication No. 2003-346089

DISCLOSURE OF THE INVENTION

Problems to be Solved by the Invention

The present invention has been developed to solve at least one of the problems with the above-mentioned prior art, and an object thereof is to provide an image data management device with which a user who manages photographic image data with a card-type recording medium can easily manage and edit the photographic image data among two or more card-type recording media.

Means for Solving the Problems

An image data management device according to a first invention has a data reading unit and a control section. The data reading unit includes a plurality of recording medium insert sections. To the recording medium insert section, a recording medium having recorded photographic image data is connected detachably and data can be read from and written to the recording medium. The control section acquires imaging date/time information included in each photographic image data, classifies the groups of photographic image data recorded in each recording medium of the data reading unit according to the imaging date/time, and moves the photographic image data among the recording media based on the result of classification. Because of this, in the first invention, it is possible to organize and manage the photographic image data on the basis of the photographing date even in the case where various imaging dates/times are mixed in two or more card-type recording media.

In a second invention, the control section records the photographic image data the imaging date of which is the same collectively in the same recording medium in the first invention. Consequently, in the second invention, the management of the photographic image data becomes easy.

In a third invention, the control section groups the photographic image data the imaging date of which is the same to create a folder in the second invention. Consequently, in the third invention, the management of the photographic image data the imaging date of which is the same becomes easier.

An image data management device according to a fourth invention has a data reading unit and a control section. The data reading unit includes a plurality of recording medium insert sections. To the recording medium insert section, a recording medium having recorded photographic image data is connected detachably and data can be read from and written to the recording medium. The control section moves the photographic image data of a specified recording medium selected from a plurality of recording media to another recording medium to maximize the vacant capacity of the specified recording medium. Consequently, in the fourth invention, the capacity of a plurality of card-type recoding media can be utilized effectively and a user can photograph while carrying a recording medium with large vacant capacity.

In a fifth invention, the control section detects the maximum recording capacity of each recording medium, respectively, and selects a recording medium with the largest maximum recording capacity as a specified recording medium in the fourth invention. Consequently, in the fifth invention, the vacant capacity of the recording medium with the largest maximum recording capacity is maximized, and therefore a user can ensure a more capacity of the recording medium to be carried for photographing.

In a sixth invention, the control section detects the maximum recording capacity of each recording medium, respectively, selects a recording medium with the smallest maximum recording capacity as a specified recording medium, and moves all of the photographic image data in the specified recording medium to another recording medium in the fourth invention. Consequently, in the sixth invention, it is possible to insert a recording medium with larger maximum recording capacity in place of the specified recording medium when all of the recording medium insert sections are occupied.

In a seventh invention, the control section detects a data recording rate of each recording medium, respectively, and selects a recording medium with the greatest data recording rate as a specified recording medium in the fourth invention. Consequently, in the seventh invention, the vacant capacity of the recording medium with the greatest data recording rate is maximized and therefore a user can photograph while carrying a recording medium with the greatest recording rate.

In an eighth invention, the control section sets priority to each recording medium insert section, selects a specified recording medium sequentially out of the recording media in the descending order of the priority of the recording medium insert section, and moves the photographic image data to the recording medium of the recording medium insert section with lower priority to maximize the vacant capacity of the recording medium sequentially in the descending order of the priority of the recording medium insert section in the fourth invention. Consequently, in the eighth invention, the image data is recorded densely in the recording medium of the recording medium insert section with lower priority and thus the capacity of the card-type recording medium can be utilized effectively.

In a ninth invention, the control section acquires imaging date/time information included in each photographic image data, classifies the groups of photographic image data recorded in each recording medium of the data reading unit according to the imaging date/time, and moves the photographic image data among the recoding media based on the result of classification in any one of the fourth to eighth inventions. Consequently, in the ninth invention, it is possible to organize the photographic image data on the basis of the imaging date when maximizing the vacant capacity of the specified recording medium.

In a tenth invention, the control section moves the photographic image data among the recording media so that the photographic image data is arranged in the order of the imaging date/time in any one of the first, second, third, and ninth inventions. Consequently, in the tenth invention, the replacement of the photographic image data for arrangement in the order of the imaging date/time is made easier.

An image data management device according to an eleventh invention has a data reading unit, a printing setting section and a control section. The data reading unit includes a plurality of recording medium insert sections. To the recording medium insert section, a recording medium having recorded photographic image data is connected detachably and data can be read from and written to the recording medium. The printing setting section specifies photographic image data to be printed from among the groups of photographic image data recorded in each recording medium of the data reading unit and creates a printing specification file relating to the printing specification. The control section duplicates the photographic image data among the recording media and records the photographic image data specified to be printed and the printing specification file in the same printing-purpose recording medium. Consequently, in the eleventh invention, even if the photographic image data specified to be printed exists over two or more recording media, it is possible to put the recording media into a single recording medium to be delivered to a shop.

In a twelfth invention, a connecter that connects the printing-purpose recording medium is provided separately from the data reading unit in the eleventh invention. Consequently, in the twelfth invention, the possibility that the printing-purpose recording medium and other recording media are mixed up becomes small.

In a thirteenth invention, the control section changes the file name of the photographic image data when moving the photographic image data in any one of the first to twelfth inventions. Consequently, in the thirteenth invention, it is possible to prevent deletion by overwriting when data is moved in the case where there are photographic image files with the same name.

In a fourteenth invention, the control section disables the operation to turn off the power supply of the image data management device during the movement of photographic image data in any one of the first to thirteenth inventions. Consequently, in the fourteenth invention, the possibility that the photographic image data is erroneously deleted by the turning-off of the power supply during the movement of data is suppressed.

In a fifteenth invention, the recording medium insert sections constituting the data reading unit are divided into two or more groups and the control section carries out movement of the photographic image data among the recording media of the recording medium insert sections of the same group in any one of the first to fourteenth inventions. Consequently, in the fifteenth invention, the card-type recording medium can be managed for each group.

An image data management device according to a sixteenth invention has a display interface, a data reading unit, and a control section. The display interface performs outputting to a monitor device including a display screen. The data reading unit includes a plurality of recording medium insert sections. To the recording medium insert section, a recording medium having recorded photographic image data is connected detachably and in which data can be read from the recording medium. The control section acquires imaging date/time information included in each photographic image data and carries out a reproduction mode to display reproduced images of the group of photographic image data recorded in each recording medium of the data reading unit on the monitor device in the order of the imaging date/time. Consequently, in the sixteenth invention, even when various imaging dates are mixed up in the two or more card-type recording media, the photographic image data can be reproduced for viewing and listening in the order of the imaging date/time.

In a seventeenth invention, the recording medium insert sections constituting the data reading unit are divided into two or more groups and the control section carries out a sequential reproduction of photographic image data among the recording media of the recording medium insert sections of the same group in the sixteenth invention. Consequently, in the seventeenth invention, the recording medium insert sections constituting the data reading unit are divided into two or more groups and it is possible to carry out the sequential reproduction of photographic image data for each group.

Here, the "recording medium" of the present invention is one capable of recording photographic image data, and is, for example, most preferably, a rewritable card-type recording medium (nonvolatile semiconductor memory or Microdrive (registered trademark), etc.) generally used in an electronic camera. The "recording medium" of the present invention is however not limited to the card-type recording medium, but may be, for example, another publicly-known recording medium, such as a magnetic tape, magnetic disk, magneto-optical disk, optical disk.

According to the present invention, by moving photographic image data among two or more card-type recording media, it is possible to easily organize the photographic image data by date, maximize the vacant capacity of the card-type recording medium, create the recording medium of the printing-purpose recording medium, etc.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

BEST MODES FOR CARRYING OUT THE INVENTION

Embodiments of the present invention will be described below in detail based on the drawings.

(Configuration of an Image Data Management Device in the Present Embodiment)

Figure 1:
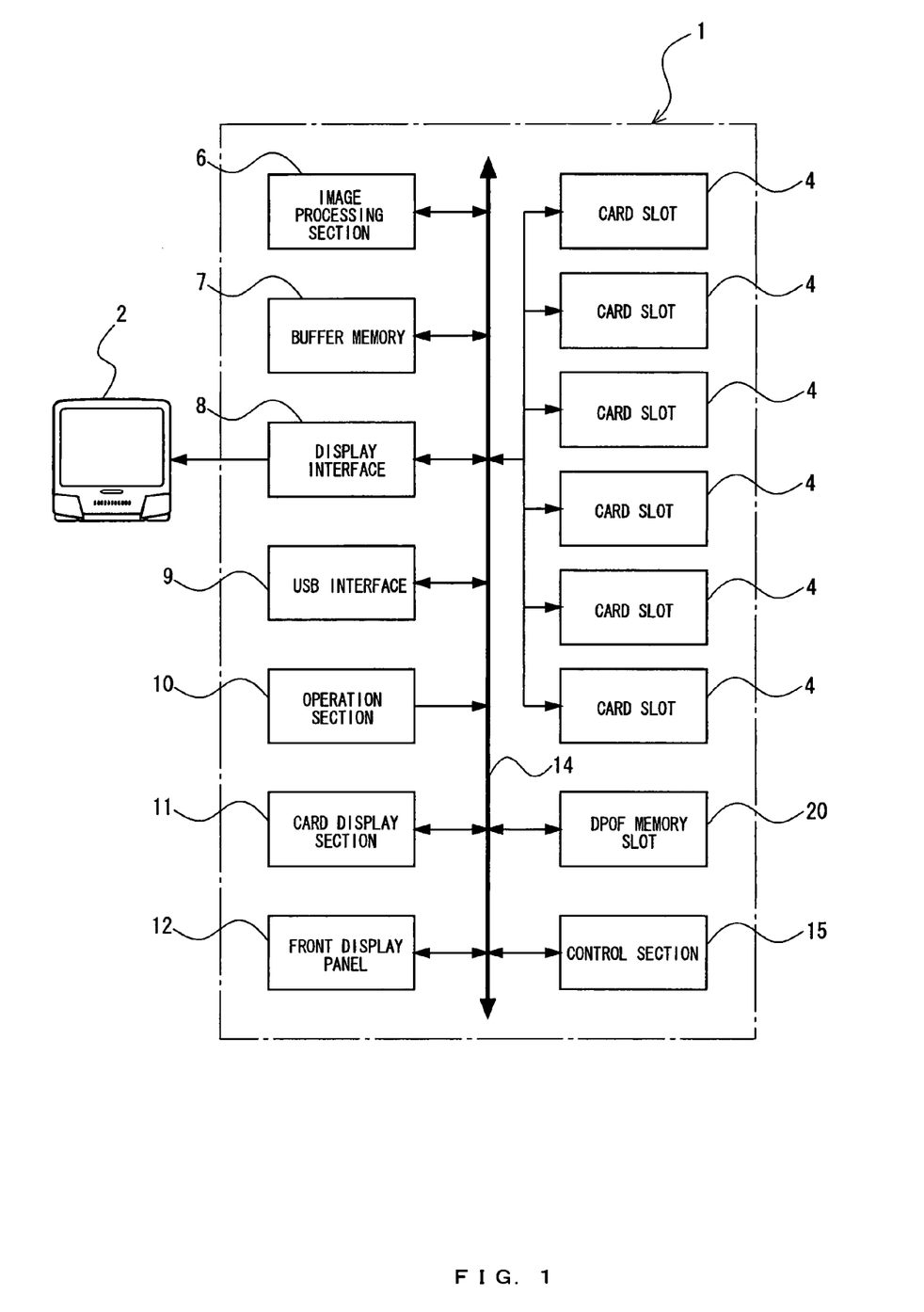
FIG. 1 is a block diagram of an image reproduction device of the present embodiment.
Figure 2:
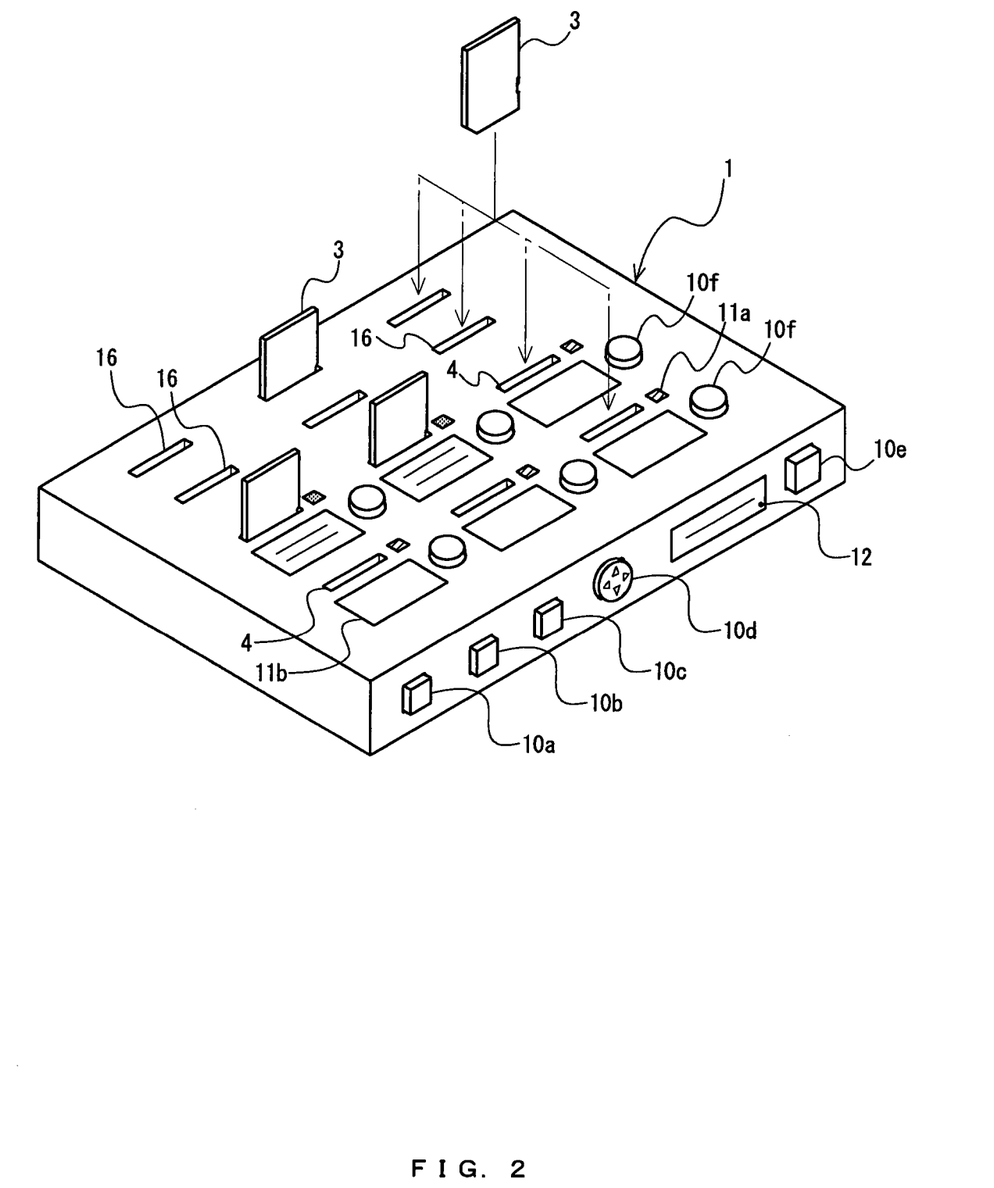
FIG. 2 is a perspective view showing an outside appearance of the image reproduction device of the present embodiment.

FIG. 1 is a block diagram of an image data management device in the present embodiment and FIG. 2 is a perspective view showing the outside appearance of the image data management device in the present embodiment. An image data management device 1 in the present embodiment is connected to a TV 2 etc. The image data management device 1 is capable of reading photographic image data photographed by an electronic camera from a publicly-known card-type recording medium 3 (semiconductor memory, Micro-drive (registered trademark), etc.). Then, the image data management device 1 is capable of displaying reproduced images of the read photographic image data on the TV 2 and of editing the photographic image data among the card-type recording media.

The image data management device 1 in the present embodiment has a plurality of card slots 4, an image processing section 6, a buffer memory 7, a display interface 8, a USB interface 9, an operation section 10, a card display section 11, a front display panel 12, a data bus 14 that connects each section, a control section 15, and a DPOF memory slot 20.

A total of the six card slots 4, three in the front and three in the rear on the top surface of the case of the image data management device 1, are provided. To each of the card slots 4, a card-type recording medium 3 is connected detachably. Inside the card slot 4, an electric contact (its drawing is omitted) connected with the data bus 14 is formed. Via the electric contact of the card slot 4, data is read and written between the card-type recording medium 3 and the image data management device 1.

In addition, on the top surface of the case of the image data management device 1, a plurality of dummy slots 16 is formed behind the card slots 4 (refer to FIG. 2). This dummy slot 16 serves as a card stand to which the card-type recording medium 3 is inserted for storage, not having a data reading/writing function. In addition, in order to improve the identifiability of the card-type recording medium 3, the depth of insertion of the card slot 4 and the dummy slot 16 is set to a depth at which a pasted label can be recognized visually in a state in which the card-type recording medium 3 is inserted.

The image processing section 6 is an image processing ASIC having a compression/decompression circuit etc. The image processing section 6 outputs image signals of a reproduced image based on the photographic image data read from the card-type recording medium 3 of the card slot 4 to TV 2.

The buffer memory 7 is a memory that temporarily saves image data during the processing of the image processing section 6 and during the movement processing of the image data, to be described later, and stores various setting contents of the device. In the buffer memory 7, edition data to be described later etc. is recorded.

The display interface 8 is an interface that outputs image signals of the image processing section 6 to the TV 2 of a display device. This display interface 8 has the publicly-known video output terminal, such as a composite video terminal, separate video terminal, component video terminal, D video terminal, etc. By the way, in the present embodiment, each video output terminal of the display interface 8 is formed on the rear side of the case (its drawing is omitted) of the image data management device 1.

By the way, the image data management device 1 may be one that integrally includes a display section (TV 2) that displays the image corresponding to the photographic image data.

The USB interface 9 controls transmission/reception of data with peripherals (for example, a photo printer etc.) connected to the image data management device 1 in conformity of the communication standards of USB (Universal Serial Bus). By the way, in the present embodiment, the USB connection terminal of the USB interface 9 is formed on the rear side of the case of the image data management device 1.

The operation section 10 has a slide show button 10a, a print button 10b, a delete button 10c, a cursor button 10d, and a power supply button 10e arranged on the front of the case, and six playback buttons 10f arranged on the top surface of the case.

The slide show button 10a is a button for displaying a slide show of the photographic image data of the currently connected card-type recording medium 3. The print button 10b is a button for specifying printing of an image currently reproduced and specifying creation of a printing specification file. The delete button 10c is a button for specifying deletion of the photographic image data of the image currently reproduced. The cursor button 10d is used when the cursor displayed on the screen in the setting mode is moved etc. In addition, the playback button 10f is arranged corresponding to each card slot 4, respectively, and used to respectively reproduce and display the image of the card-type recording medium 3 mounted on each card slot 4.

The card display section 11 is constituted by a set of an access lamp 11a and a liquid crystal display section 11b. Six sets of the card display section 11 are arranged in the vicinity of each card slot 4 on the top surface of the case and each card display section 11 corresponds to each card slot 4.

The access lamp 11a lights up in the state in which the card-type recording medium 3 is inserted into the card slot 4 and blinks at the time of read and write of the card-type recording medium 3. In addition, the access lamp 11a changes the colors when lit up in accordance with the vacant capacity of the card-type recording medium 3. Consequently, a user can identify the card-type recording medium 3 having a predetermined vacant capacity at a glance.

Figure 3:
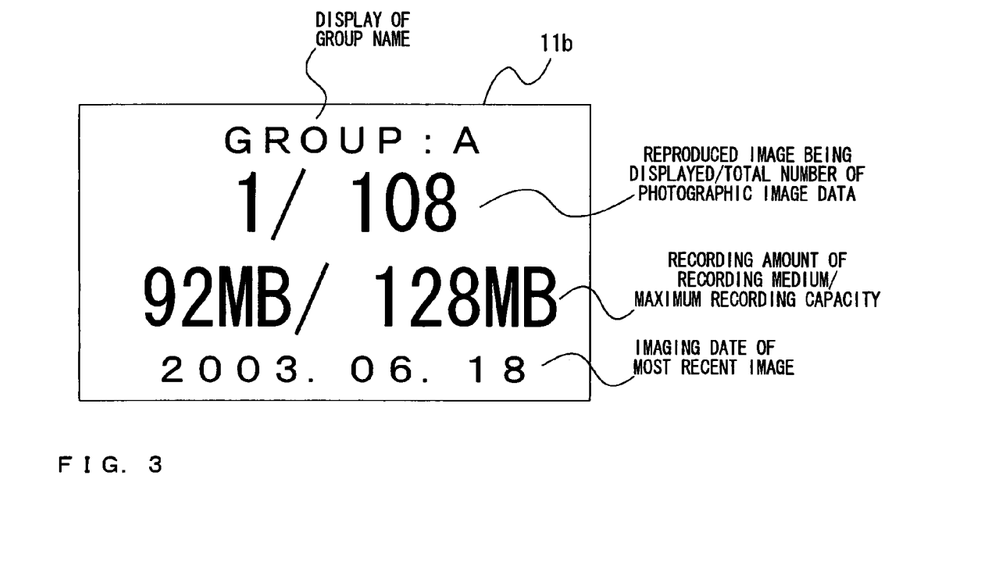
FIG. 3 is a diagram of a display example of a liquid crystal display section.

On the other hand, on the liquid crystal display section 11b, the maximum recording capacity of the card-type recording medium 3, the amount of records at present, and the most recent imaging date among the card-type recording media 3 are displayed. In addition, as will be described later, when the card slots 4 are divided into two or more groups, the group name of the card slot 4 is displayed on the liquid crystal display section 11b. Further, on the liquid crystal display section 11b, in the case of the reproduction display by the playback button 10f, the number of the reproduced image being displayed and the total number of photographic image data (the number of files of photographed images) recorded in the card-type recording medium 3 are displayed (refer to FIG. 3).

The front display panel 12 is a liquid crystal display section arranged on the front of the case. On the front display panel 12, in the case of the slide show display by the slide show button 10a, the number of the reproduced image being displayed and the total number of image data for monitor are displayed.

The control section 15 controls the operation of each section of the device in the "reproduction/printing specification mode" to carry out reproduction of photographic image data and printing specification, the "card edition mode" to move photographic image data among the card slots 4, the "setting mode" to carry out various settings, such as grouping of the card slots 4, setting of priority, etc.

Figure 4:
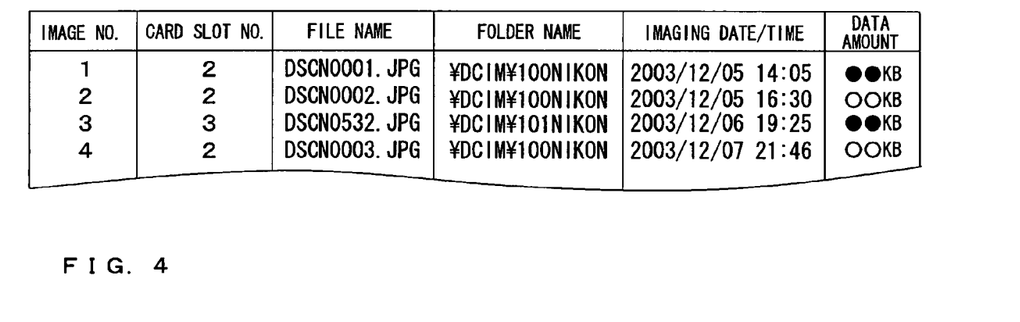
FIG. 4 is a diagram showing a part of data structure of edition data.

In addition, the control section 15 reads data from the card-type recording medium 3 mounted on the card slot 4 and connected to the data bus 14 and creates edition data to record it in the buffer memory 7. The edition data includes the number of the card slot to which the card-type recording medium 3 is connected and information of each photographic image data (file name, information about directory path (folder name), imaging date/time, amount of data, etc.) (refer to FIG. 4). In addition, the control section 15 also records the maximum recording capacity of the card-type recording medium 3 being connected in the buffer memory 7. Note that, when detecting the removal of the card-type recording medium 3 from the card slot 4, the control section 15 deletes edition data etc. corresponding the removed card-type recording medium 3 from the buffer memory 7.

Further, the control section 15 can divide the six card slots 4 into two or more groups based on the setting of the user and control the movement, edition, sequential reproduction, etc. of photographic image data for each group.

The DPOF memory slot 20 is formed on the rear side of the case of the image data management device 1 and constituted in the same manner as the above-mentioned card slot 4. In the card-type recording medium 3 mounted on the DPOF memory slot 20, a printing specification file and photographic image data specified to be printed are recorded.

(Operation of the Image Data Management Device in the Present Embodiment)

The operation of the image data management device in the present embodiment will be described below.

First, when the card-type recording medium 3 is inserted into the card slot 4, the control section 15 generates edition data of the inserted card-type recording medium 3 and records it in the buffer memory 7. Note that the control section 15 deletes the edition data corresponding to the removed card-type recording medium 3. Consequently, the edition data of the buffer memory 7 corresponds to the currently connected card-type recording medium 3.

In addition, at the time of connection of the card-type recording medium 3, the control section 15 reads the maximum recording capacity, the vacant capacity, and the most recent imaging date from the card-type recording medium 3 and display the information on the card display section 11.

Further, with the image data management device in the present embodiment, it is possible to divide the card slots 4 into two or more groups and carry out the reproduction, edition, etc., of the card-type recording medium independently for each group. In other words, when the groups of card slots 4 are set, the control section 15 manages the edition data for each group. Then, the slide show display in the "reproduction/printing specification mode" and the movement of the photographic image data in the "card edition mode", to be described later, are carried out only in the same group, as a result. Due to the group setting, it is also made possible, for example, to share the single image data management device among two or more persons to manage the photographic image data.

(Operation in "Reproduction/Printing Specification Mode")

When the playback button 10f is pressed in the above-mentioned "reproduction/printing specification mode", the control section 15 reads photographic image data from the card-type recording medium 3 in the card slot 4 and displays the reproduced image sequentially on the TV 2. Alternatively, in response to the input of the playback button 10f, the control section 15 may display a list of thumbnail images of the photographic image data. Consequently, the user can easily grasp what kind of photographic image data is recorded in the card-type recording medium 3 by pressing the playback button.

In addition, when the slide show button 10a is pressed in the above-mentioned "reproduction/printing specification mode", the control section 15 displays the slide show of the photographic image data. Specifically, first, the control section 15 sorts the edition data in the order of the imaging date/time. Next, based on the sorted edition data, the control section 15 reads each photographic image data in the order of the imaging data/time from among the plurality of the card-type recording media 3 mounted in the respective card slots 4. Then, the control section 15 reproduces and displays the photographic image data sequentially on the TV 2 via the display interface 8. Consequently, when a journey or a wedding ceremony has been photographed by two or more electronic cameras, it is possible to view and listen to the groups of photographic image data photographed by different electronic cameras in chronological order.

In this slide show, the control section 15 can display information about the photographic image data being reproduced (display indicative of the card slot 4 in which the photographic image data is recorded, file name of the photographic image data, imaging date/time, etc.) on the TV 2 together with the reproduced image. By the way, in the above-mentioned slide show, the number of the reproduced image being reproduced and the total number of photographic image data are displayed on the front display panel 12.

Figure 5:
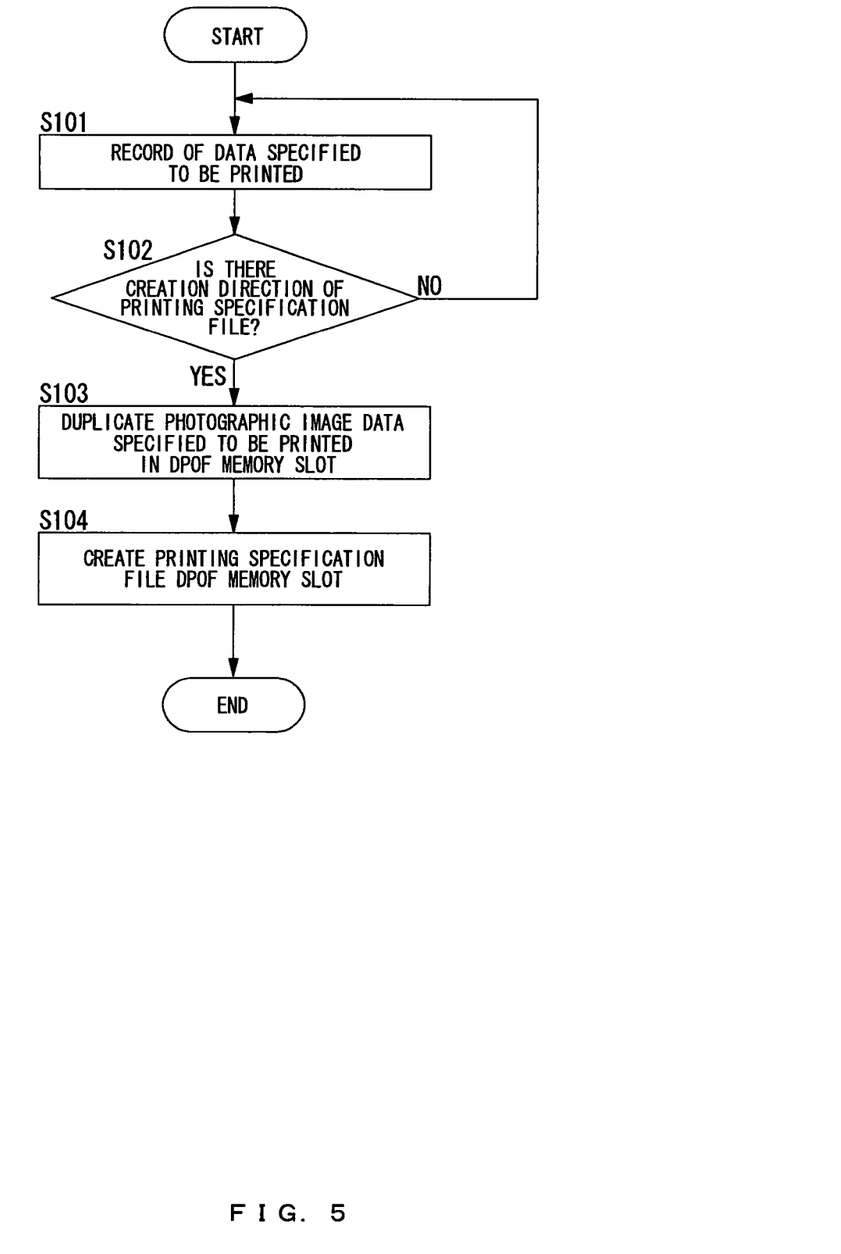
FIG. 5 is a flow diagram showing a series of operations at the time of specifying photographic image data to be printed.

Further, in the "reproduction/printing specification mode", it is possible to specify photographic image data to be printed by a predetermined operation. Here, FIG. 5 is a flow diagram showing a series of operations at the time of specifying photographic image data to be printed.

Each time the printing is specified at the time of reproduction of photographic image data, the control section 15 records the correspondence relationship between the image number of the photographic image data specified to be printed and the number of prints, etc. in the buffer memory 7 (5101). Note that, it is also possible to collectively specify the photographic image data to be printed of the plurality of the card-type recording media 3 mounted on the respective card slots 4. Then, the control section 15 stands by for the creation direction of the printing specification file (for example, input of the print button 10b) (S102).

When the creation of the printing specification file is directed (YES side in S102), the control section 15 reads data of the buffer memory 7. Then, the control section 15 duplicates the photographic image data specified to be printed from the card-type recording medium 3 in which the photographic image data is recorded to the card-type recording medium 3 of the DPOF memory slot 20 (S103). Then, the control section 15 creates a printing specification file in the card-type recording medium 3 (printing-purpose recording medium) mounted on the DPOF memory slot 20 (S104). By the way, the printing specification file is created in conformity of the DPOF standard and the file name of the photographic image data specified to be printed, the imaging date/time, the number of prints, etc., are described in a text format.

In the present embodiment, even when the photographic image data specified to be printed is recorded separately in two or more card slots 4, it is possible to put the photographic image data in the card-type recording media carried to the shop into one card-type recording medium when ordering printing with the DPOF. In addition, since the DPOF memory slot 20 to which the printing-purpose recording medium is connected is independent of the card slot 4, the user can easily identify the printing-purpose recording medium from other recording media.

(Operation in "Card Edition Mode")

On the other hand, in the "card edition mode", the control section 15 carries out "organizing image data in order of imaging date/time" or "vacant card creation". In the "card edition mode", the control section 15 changes the file name of photographic image data at the time of movement of the photographic image data to another because there is the possibility that the data may be overwritten and deleted if the same file name exists in different photographic image data. In addition, in the "card edition mode", in order to avoid erroneous deletion of photographic image data due to the shutdown of the power supply, the control section 15 disables the function to turn off the power supply by the power supply button 10e during the period of movement of photographic image data and shuts down the power supply at the time of completion of movement of photographic image data.

Figure 6:
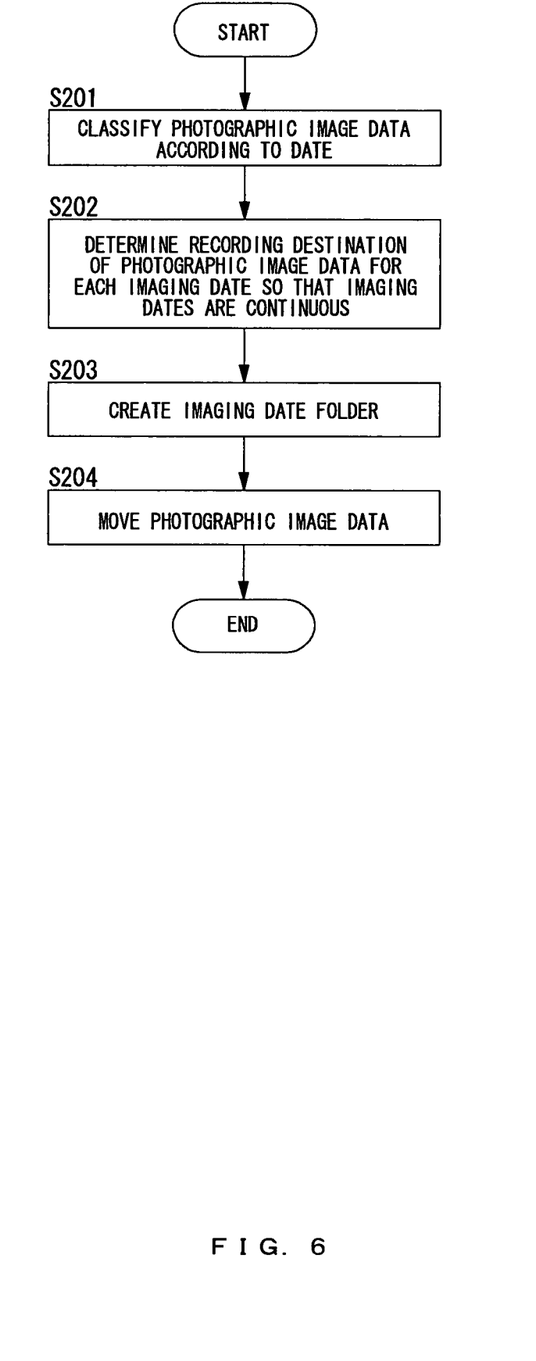
FIG. 6 is a flow diagram showing a series of operations in "organizing image data in the order of imaging date/time"

In the case of "organizing image data in order of imaging date/time", the control section 15 moves photographic image data among the card-type recording media 3 so that the photographic image data is organized in the order of imaging date/time among two or more card-type recording media 3. Consequently, when a journey or a wedding ceremony has been photographed by two or more electronic cameras, it is possible to organize and store the groups of photographic image data photographed by different electronic cameras in chronological order. Here, FIG. 6 is a flow diagram showing a series of operations in "organizing image data in order of imaging date/time".

First, the control section 15 sorts edition data in the order of the imaging date/time. Due to this, the photographic image data is classified on the edition data according to the imaging date (S201). Next, the control section 15 determines a destination to which the photographic image data is recorded for each imaging date based on the amount of data of the photographic image data classified according to the imaging date and the recording capacity of each of the card-type recording media 3 (S202).

Specifically, the control section 15 refers to the priority of each of the card slots 4 and assigns a recording destination of the photographic image data of the card-type recording medium 3 in the descending order of the priority of the card slot 4. The control section 15 assigns a recording destination of the photographic image data so that the imaging dates/times are continuous in the same card-type recording medium 3. When it is not possible to record the photographic image data of the next imaging date altogether, the control section 15 assigns the recoding destination to the card-type recording medium 3 with the next priority. In this manner, the recording destination of photographic image data is determined in the order of imaging date/time in the descending order of the priority of the card-type recording medium 3.

Then, the control section 15 creates an imaging date folder in each of the card-type recording media 3, respectively (S203), and moves each photographic image data to the imaging date folder of the assigned recording destination (S204). In this manner, the "organizing image data in order of imaging date/time" is completed.

Figure 7:
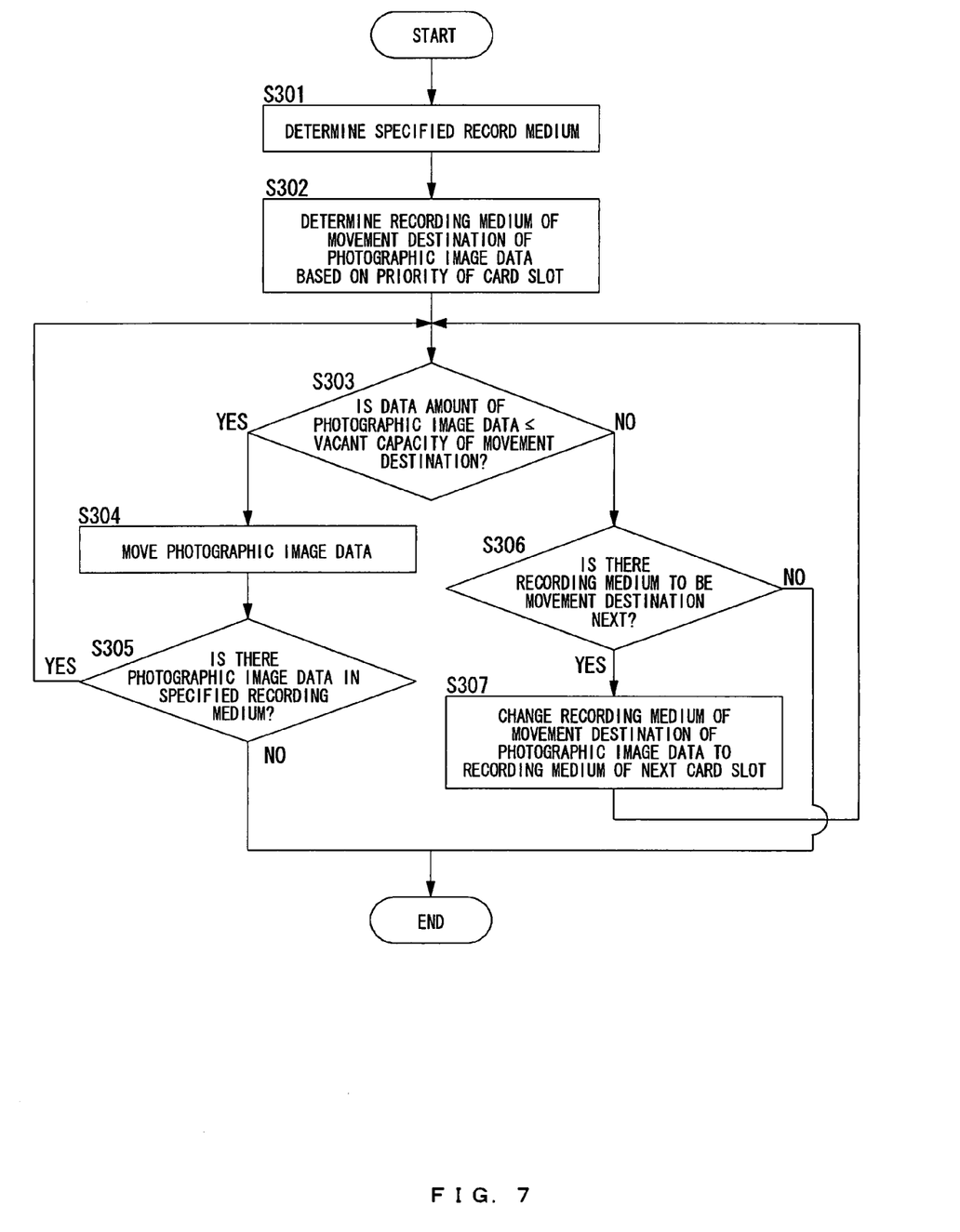
FIG. 7 is a flow diagram showing an operation of a first example of "vacant card creation"

In the case of the "vacant card creation", the control section 15 moves photographic image data of a specified recording medium to another card-type recording medium 3 to maximize the vacant capacity of the specified recording medium. Consequently, the user can use the card-type recording medium 3 with a large vacant capacity always and effectively utilize the vacant capacity among two or more card-type recording media. Here, FIG. 7 is a flow diagram showing the operation in a first example of the "vacant card creation".

The control section 15 determines the card-type recording medium 3 (specified recording medium) maximizing the vacant capacity (S301). For example, when priority is given to the maximum recording capacity, the control section 15 determines the card-type recording medium 3 with the largest maximum recording capacity as a specified recording medium. Alternatively, when priority is given to the data recording rate, the control section 15 detects the data recording rate of each of the card-type recording media 3 and determines the card-type recording medium 3 with the greatest data recording rate as a specified recording medium.

Next, the control section 15 refers to the priority of each of the card slots 4 and selects the recording medium of the card slot 4 with the lowest priority as a movement destination of data (S302). Then, the control section 15 determines whether or not the amount of data of photographic image data to be moved from the specified recording medium is equal to or less than the vacant capacity of the card-type recording medium 3 of the movement destination (S303).

When the amount of data is equal to or less than the vacant capacity (YES side in S303), the control section 15 moves photographic image data from the specified recording medium to the card-type recording medium 3 of the movement destination (S304). After this, the control section 15 determines whether or not there is photographic image data in the specified recording medium (S305). When there is photographic image data (YES side in S305), the control section 15 returns the process to S303 and moves the next photographic image data. When there is no photographic image data (NO side in S305), it means that the vacant capacity of the specified recording medium has been maximized, and therefore, the control section 15 terminates movement of data.

On the other hand, when the amount of data exceeds the vacant capacity (NO side in S303), the control section 15 determines whether or not there exists a recording medium to be a next movement destination based on the priority (S306). When, there exists a next movement destination (YES side in S306), the control section 15 changes the movement destination of data to the recording medium of the next card slot 4 (S307) and returns the process to S303, and continues movement of photographic image data. On the other hand, when there exist no movement destination (NO side in S306), it means that the photographic image data remains in the specified recording medium, however, there is no vacant capacity in other card-type recording media 3, and therefore, the control section 15 terminates movement of data.

Here, with the configuration in which the specified recording medium is selected in the descending order of the data reading rate and further, as the card-type recording medium 3 of the movement destination, the card-type recording medium with a greater data recording rate is selected, it is possible to carry out the above-mentioned movement processing of photographic image data swiftly.

Figure 8:
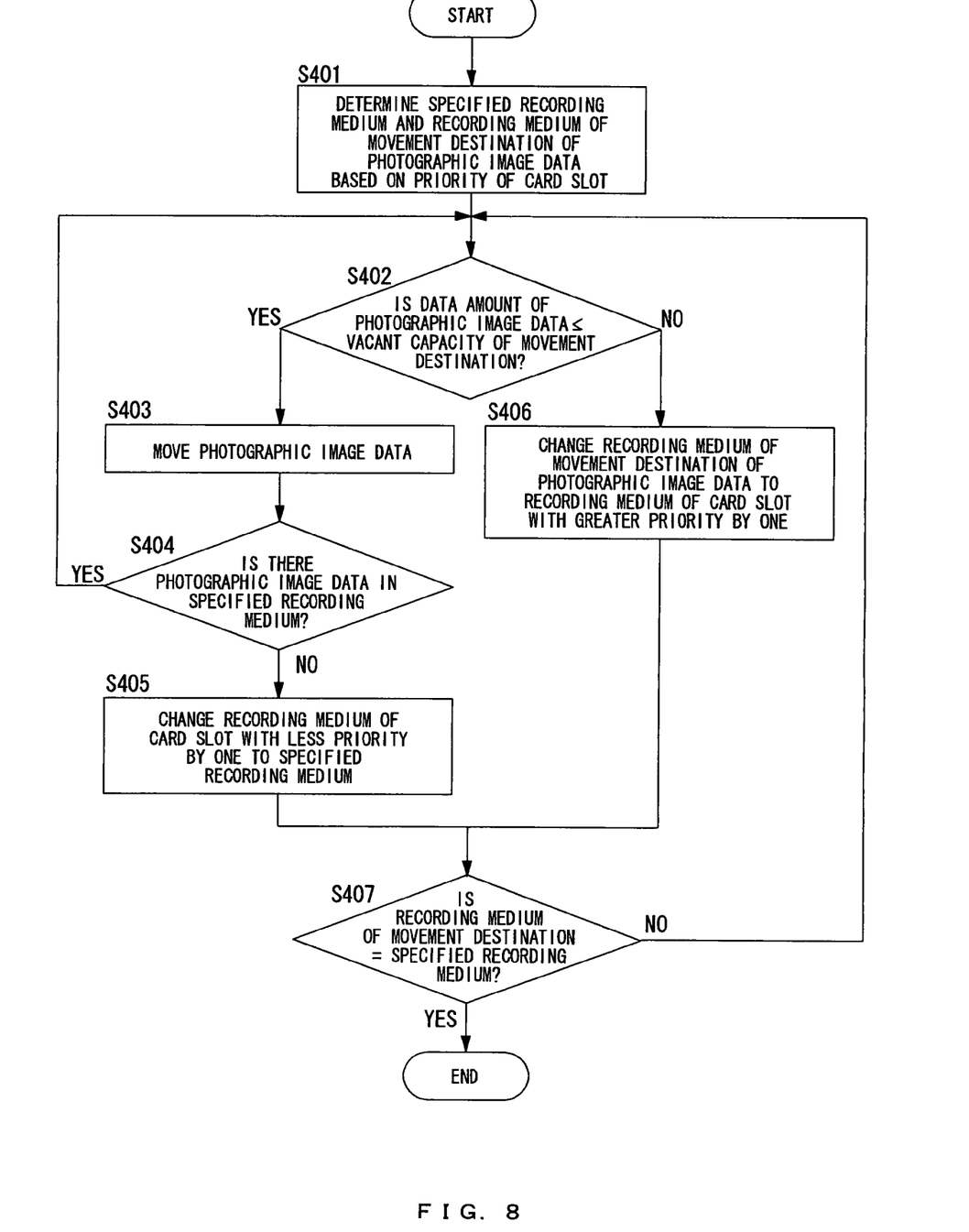
FIG. 8 is a flow diagram showing an operation of a second example of "vacant card creation"

FIG. 8 is a flow diagram showing the operation of a second example of the "vacant card creation". In the example in FIG. 8, priority is given to the card slot 4 and the vacant capacity of the recording medium is maximized sequentially in the descending order of the priority of the card slot 4.

The control section 15 refers to the priority of each of the card slots 4 and determines the recording medium of the card slot 4 with the highest priority as a specified recording medium. In addition, the control section 15 selects the recording medium of the card slot 4 with the lowest priority as a movement destination of data (S401).

Then, the control section 15 determines whether or not the amount of data of the photographic image data to be moved from the specified recording medium is equal to or less than the vacant capacity of the card-type recording medium 3 of the movement destination (S402).

When the amount of data is equal to or less than the vacant capacity (YES side in S402), the control section 15 moves the photographic image data from the specified recording medium to the card-type recording medium 3 of the movement destination (S403). After this, the control section 15 determines whether or not there is photographic image data in the specified recording medium (S404). When there is photographic image data (YES side in S404), the control section 15 returns the process to S402 and moves the next photographic image data. When there is no photographic image data (NO side in S404), the control section 15 changes the recording medium of the card slot 4 the priority of which is lower by one than that of the current specified recording medium to a specified recording medium (S405) and then advances the process to S407.

On the other hand, when the amount of data exceeds the vacant capacity (NO side in S402), the control section 15 changes the movement destination of data to the recording medium of the card slot 4 the priority of which is higher by one (S406) and then advances the process to S407.

Then, the control section 15 determines whether or not the recording medium of the card slot 4 of the movement destination corresponds to the specified recording medium (S407). When it corresponds to the specified recording medium (YES side), since there is no vacant capacity in the card-type recording medium 3 with a lower priority, the control section 15 terminates movement of data. On the other hand, when it does not correspond to the specified recording medium (NO side), the control section 15 returns the process to S402 and continues movement of photographic image data.

Figure 9:
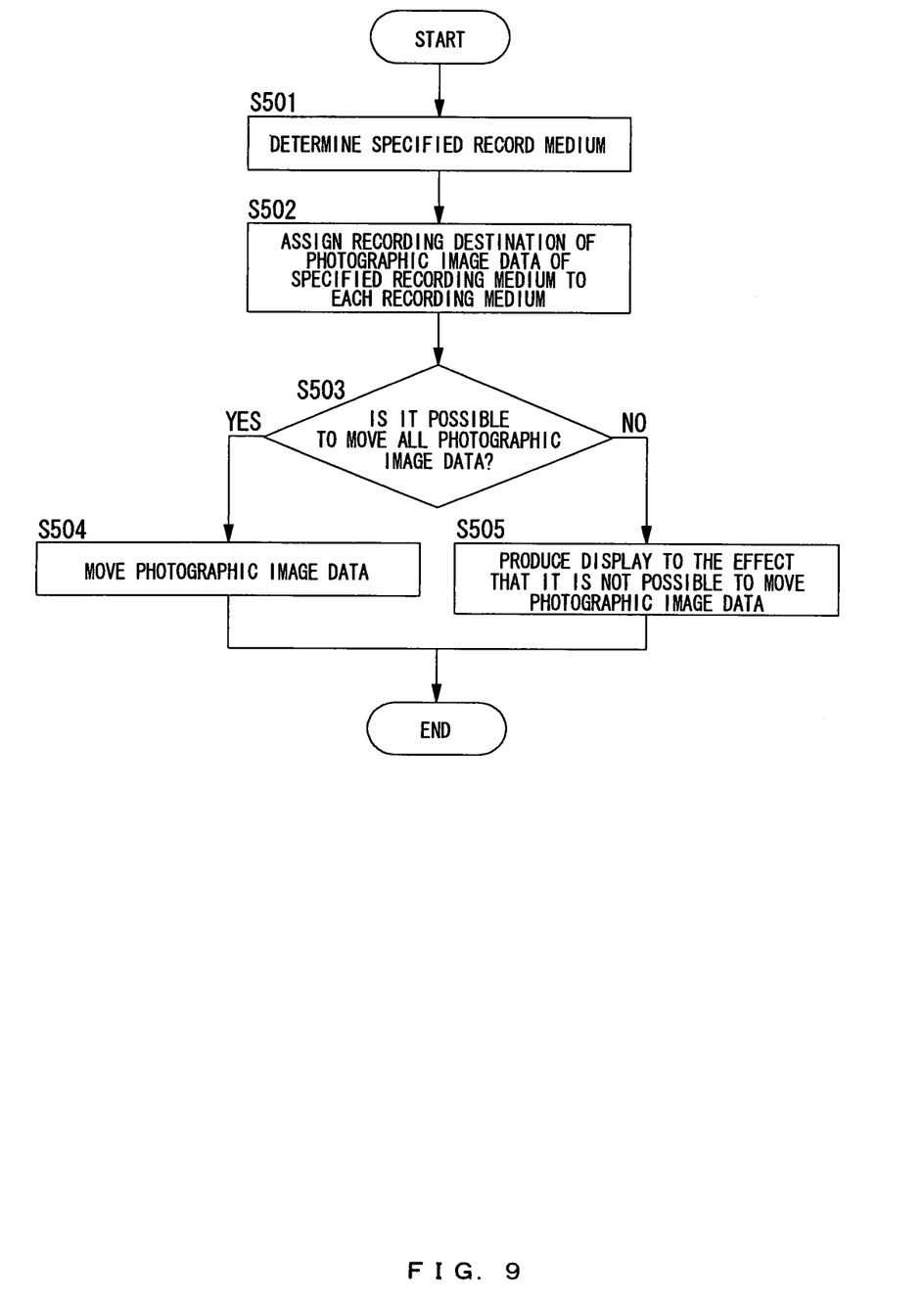
FIG. 9 is a flow diagram showing an operation of a third example of "vacant card creation".

FIG. 9 is a flow diagram showing the operation of a third example of the "vacant card creation". In the example in FIG. 9, it is made possible to vacate a card slot by moving all of the photographic image data of the recording medium with the smallest recording capacity to other recording media.

The control section 15 determines the card-type recording medium 3 with the smallest maximum recording capacity as a specified recording medium based on edition data (S501). Next, the control section 15 detects the vacant capacity of each of the card-type recording media 3 based on the edition data and assigns the recording destination of photographic image data of the specified recording medium to each of the card-type recording media 3 (S502).

Then, the control section 15 determines whether or not it is possible to move all of the photographic image data of the specified recording medium (S503). When it is possible to move the photographic image data (YES side), the control section 15 moves each of the photographic image data to the recording destination assigned in S502 (S504). Due to this, when the card slots 4 are occupied, it is made possible to vacate the card-type recording medium 3 with the smallest capacity and insert a recording medium with a larger maximum recording capacity instead. On the other hand, when it is not possible to move the photographic image data (NO side), the control section 15 produces a display to the effect that movement is not possible and then terminates the operation (S505).

(Supplementary Items of Embodiments)

The present invention has been described with the above-mentioned embodiments, however, the technical scope of the present invention is not limited to the above-mentioned embodiments.

(1) When there is not imaging date/time of the photographic image data in the above-mentioned embodiments, the control section 15 temporarily sets the date/time of the photographic image data as described in (a) to (c) in the following. For example, (a) the control section 15 temporarily sets the date/time when the card-type recording medium 3 is connected to the control section 15 via the card slot 4 and data bus 14 as the date/time of the photographic image data. (b) When photographic image data without imaging date/time is stored in a folder, the control section 15 temporarily sets the date/time of creation of the folder as the date/time of the photographic image data. (c) When the photographic image data with the imaging date/time mixedly exists in the card-type recording medium 3 of the recording destination, the control section 15 sorts the photographic image data of the card-type recording medium 3 according to the file name and temporarily sets the imaging date/time using that of the photographic image data arranged before or after the photographic image data.

In addition, the control section 15 may set so that the photographic image data without imaging date/time is arranged after the most recent imaging date/time. Alternatively, the control section 15 may temporarily set the imaging date/time based on the least recent imaging date/time of another card-type recording medium 3 when the card-type recording medium 3 is connected.

(2) In the "vacant card creation" in the above-mentioned embodiments also, the control section 15 may move and organize the photographic image data so that the photographic image data is arranged according to the imaging date/time.

(3) In the above-mentioned embodiments, the control section 15 may have a function to create a recording medium for presenting photographic image data by duplicating specified photographic image data to the card-type recording medium 3 of the predetermined card slot 4 or the DPOF memory slot 20.

(4) In addition, in the "vacant card creation" in the above-mentioned embodiments, whenever photographic image data is moved, the photographic image data is always deleted from the recording medium of the movement source. However, except in the "vacant card creation", there may be a case where the photographic image data is retained as it is in the recording medium of the movement source (duplication of photographic image data) in addition to the case where after the photographic image data is moved, the photographic image data is deleted from the recording medium of the movement source.

The invention is not limited to the above embodiments and various modifications may be made without departing from the spirit and scope of the invention. Any improvement may be made in part of all the components.

The invention claimed is:

1. An image data management device for managing image data including date/time information, comprising:
   a plurality of medium insert sections, each of which accepts a medium storing the image data; and
   a controller that is configured to
   (1) acquire the date/time information from each image data stored in a plurality of mediums that are simultaneously accepted by the plurality of medium insert sections,
   (2) create edition data that includes the date/time information,
   (3) read out the image data from the plurality of mediums, and move the image data from a first of the plurality of mediums to a second of the plurality of mediums based on the edition data so that the image data to be stored in the second of the plurality of mediums are arranged in order of date/time,
   (4) delete the image data stored in the first of the plurality of mediums after the movement of the image data to the second of the plurality of mediums, and
   (5) output the image data for display.

2. The image data management device according to claim 1, wherein:
   the controller is configured to
   (1) divide the plurality of medium insert sections into two or more groups of mediums,
   (2) create the edition data for each of the groups of mediums and
   (3) read out and move the image data among each of the groups of mediums.

3. The image data management device according to claim 1, wherein the controller is configured to temporarily set the date/time information of the image data to be read from the plurality of mediums in case where the date/time information is not in the image data.

4. The image data management device according to claim 1, wherein:
   the controller is configured to change a file name of the image data when moving the image data.

5. The image data management device according to claim 1, wherein:
   the controller is configured to disable a function to turn off the image data management device during the movement of the image data.

6. The image data management device according to claim 1, wherein:
   the controller is configured to move the image data including same date information from the first of the plurality of mediums to the second of the plurality of mediums.

7. The image data management device according to claim 6, wherein:
   the controller is configured to
   (1) create a folder in the second of the plurality of mediums and
   (2) move the image data including the same date information to the folder.

8. A method of managing image data stored in a medium, the image data including date/time information, comprising:
   acquiring date/time information included in each image data stored in a plurality of mediums that are simultaneously connected;
   creating edition data that includes the date/time information;
   reading out the image data from the plurality of mediums;
   moving the image data from a first of the plurality of mediums to a second of the plurality of mediums based on the edition data so that the image data to be stored in the second of the plurality of mediums are arranged in order of date/time;
   deleting the image data stored in the first of the plurality of mediums after the movement of the image data to the second of the plurality of mediums; and
   outputting the image data for display.

9. The method of managing image data according to claim 8, further comprising:
   temporarily setting the date/time information of the image data to be read from the plurality of mediums in case where the date/time information is not in the image data.

10. The method of managing image data according to claim 8, further comprising:
    changing a file name of the image data when moving the image data.

11. The method of managing image data according to claim 8, further comprising:
    disabling a function to turn off a power supply during the movement of the image data.

12. The method of managing image data according to claim 8, wherein
    the step of moving the image data moves the image data including same date information from the first of the plurality of mediums to the second of the plurality of mediums.

13. The method of managing image data according to claim 12, further comprising:
    creating a folder in the second of the plurality of mediums, wherein
    the step of moving the image data moves the image data including the same date information to the folder.

14. The method of managing image data according to claim 8, further comprising:
    dividing the plurality of mediums into two or more groups of mediums, wherein
    the step of creating the edition data creates the edition data for each of the groups of mediums; and
    the steps of reading out and moving the image data read and move the image data among each of the groups of mediums.

* * * * *